US006795689B1

(12) United States Patent
Ögren et al.

(10) Patent No.: US 6,795,689 B1
(45) Date of Patent: Sep. 21, 2004

(54) CELL STATUS MESSAGING IN A RADIO COMMUNICATIONS SYSTEM

(75) Inventors: Mikael Ögren, Umeå (SE); Göran Eriksson, Umeå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/507,926

(22) Filed: Feb. 22, 2000

(51) Int. Cl.[7] ............................................. H04B 17/00
(52) U.S. Cl. ................... 455/67.13; 455/456; 455/67.7; 370/331
(58) Field of Search .................................. 455/450, 439, 455/431, 436, 437, 561, 438, 442, 453, 446, 456, 67.7, 67.3, 522, 510, 67.1, 423, 424, 425; 370/252, 331, 332, 335

(56) References Cited

U.S. PATENT DOCUMENTS

| | | | | |
|---|---|---|---|---|
| 5,455,821 A | * | 10/1995 | Schaeffer et al. ............ | 370/332 |
| 5,603,085 A | * | 2/1997 | Shedlo ......................... | 455/450 |
| 5,799,154 A | * | 8/1998 | Kuriyan ....................... | 709/223 |
| 5,802,473 A | * | 9/1998 | Rutledge et al. ............ | 455/446 |
| 5,831,976 A | | 11/1998 | Lin et al. | |
| 5,835,564 A | * | 11/1998 | Chang et al. ............... | 379/1.01 |
| 5,873,036 A | * | 2/1999 | Vucetic ....................... | 455/439 |
| 6,002,676 A | | 12/1999 | Fleming | |
| 6,131,030 A | * | 10/2000 | Schon et al. ................. | 455/438 |
| 6,141,534 A | * | 10/2000 | Snell et al. .................. | 455/12.1 |
| 6,178,327 B1 | * | 1/2001 | Gomez ......................... | 455/445 |
| 6,266,514 B1 | * | 7/2001 | O'Donnell ................. | 455/67.3 |
| 6,289,220 B1 | * | 9/2001 | Spear ........................... | 455/436 |
| 6,292,667 B1 | * | 9/2001 | Wallentin et al. ............ | 455/458 |
| 6,341,225 B1 | * | 1/2002 | Blanc ........................... | 455/522 |
| 6,374,112 B1 | * | 4/2002 | Widegren et al. ......... | 455/452.2 |
| 6,449,481 B1 | * | 9/2002 | Kwon et al. ................. | 455/437 |
| 6,456,849 B1 | * | 9/2002 | Purnadi et al. .............. | 455/453 |
| 6,519,235 B1 | * | 2/2003 | Kim et al. .................... | 370/331 |
| 6,535,979 B1 | * | 3/2003 | Vialen et al. ................ | 713/163 |
| 6,603,773 B2 | * | 8/2003 | Laakso et al. ............... | 370/441 |
| 6,615,044 B2 | * | 9/2003 | Tigerstedt et al. ........... | 455/437 |

FOREIGN PATENT DOCUMENTS

| | | |
|---|---|---|
| WO | 96/37061 | 11/1996 |
| WO | 97/01941 | 1/1997 |
| WO | 98/30033 | 7/1998 |
| WO | 99/04511 | 1/1999 |

OTHER PUBLICATIONS

3G TS 25.433 V3.0.0 (Jan. 2000) *Technical Specification, 3rd Generation Partnership Project; Technical Specification Group Radio Access Network; UTRAN Iub Interface NBAP Signalling* (3G TS 25.433 version 3.0.0 Release 1999).

* cited by examiner

Primary Examiner—Pablo N. Tran
(74) Attorney, Agent, or Firm—Nixon & Vanderhye P.C.

(57) ABSTRACT

A radio communications system includes a radio network control node coupled to a base station for communicating with mobile stations over a radio interface via the base station. The base station includes one or more cells, each cell having plural cell resources. A resource indication message sent from the base station to the radio network control node includes a cell resource identifier and indicates a status of a particular cell resource. The cell resource identifier is associated with a cell identifier in the resource indication message to eliminate any ambiguity at the radio network control node that might be created if the cell resource identifiers are not unique outside the context of each cell. Example implementations are described in a "service impacting" part of a Resource Status Indication Message (RSIM) in a third generation, wideband CDMA cellular radio communications system.

25 Claims, 8 Drawing Sheets

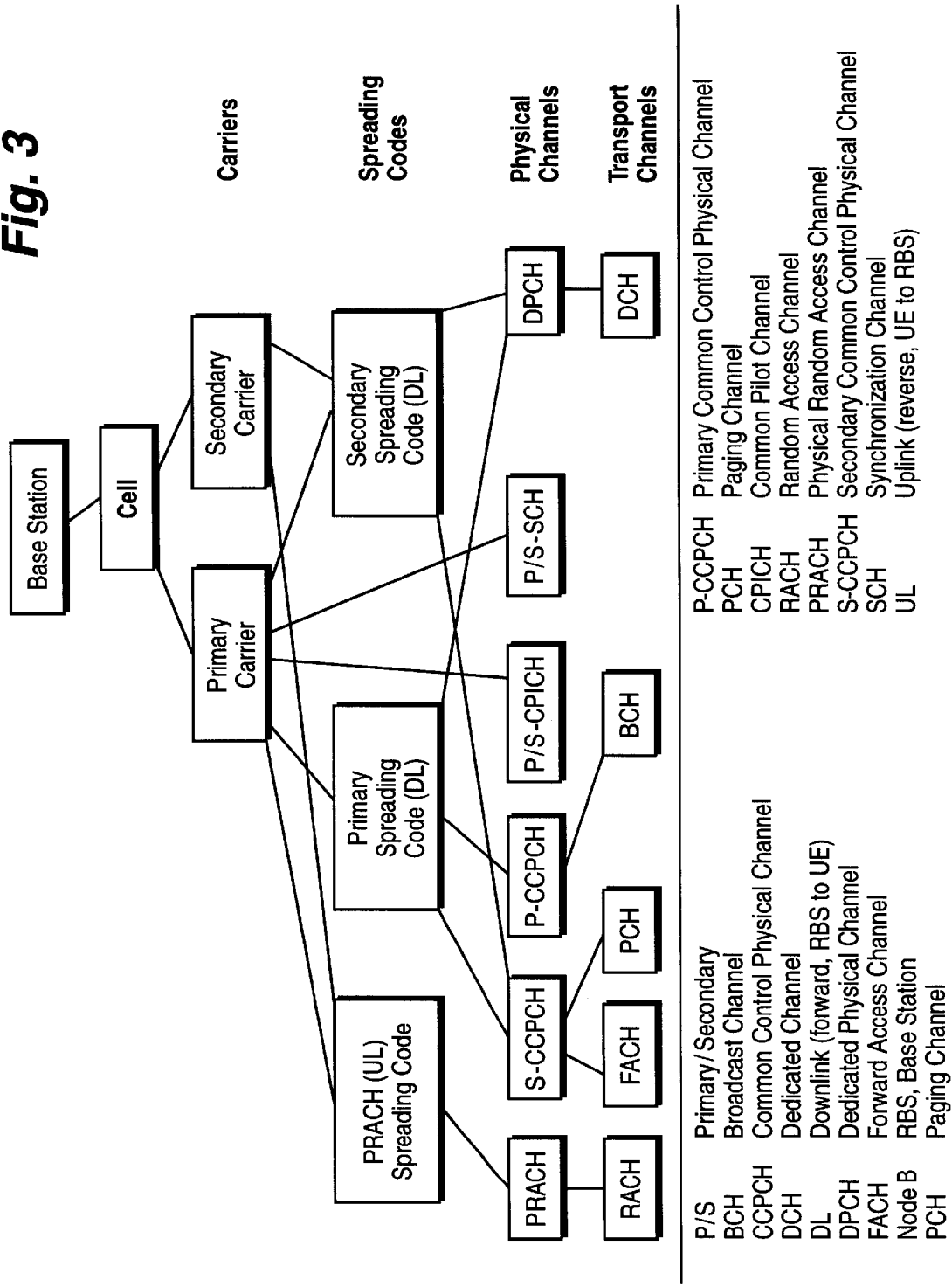

CELL STATUS MESSAGING IN A RADIO COMMUNICATIONS SYSTEM

FIELD OF THE INVENTION

The present invention relates to cellular radio communications, and more particularly, to the reporting and handling of cell status messages from a radio base station. The invention finds one example application in Wideband Code Division Multiple Access (WCDMA) communications systems.

BACKGROUND AND SUMMARY OF THE INVENTION

Direct Sequence Code Division Multiple Access (DS-CDMA) allows signals to overlap in time and frequency so that CDMA signals from multiple users simultaneously operate in the same frequency band or spectrum. In principle, a source information digital data stream to be transmitted is impressed upon a much higher rate datastream generated by a pseudo-random noise (PN) code generator. This combination of a higher bit rate code signal with a lower bit rate information stream "spreads" the bandwidth of the information data stream. Each information data stream is allocated a unique PN or spreading code (or a PN code having a unique offset in time) to produce a signal that can be separately received at a receiving station. From a received composite signal of multiple, differently-coded signals, a PN coded information signal is isolated and demodulated by correlating the composite signal with a specific PN spreading code associated with that PN coded information signal. This inverse, de-spreading operation "compresses" the received signal to permit recovery of the original data and at the same time suppress interference from other users.

Wideband CDMA systems contain one or several radio frequency carriers. Each radio frequency carrier contains a number of spreading codes which may be allocated to provide different data rates to satisfy different mobile user requirements. Some of those spreading codes are used for traffic channels and some are used for common control channels such as random access channels, paging channels, broadcast channels, etc. In order to provide flexibility in how bandwidth and other radio resources are allocated in wideband CDMA systems, a "logical" cell is defined. Such a logical cell may be allocated more than one radio frequency carrier thereby permitting resources associated with different carriers belonging to the same cell to be allocated, for example, to a single mobile station requiring a high bit rate connection. The additional carrier(s) effectively provide more traffic channels.

One example of a wideband CDMA system is the universal mobile telecommunications system (UMTS) 10 shown in FIG. 1. A representative, circuit-switched, external core network, shown as a cloud 12 may be for example the public switched telephone network (PSTN) and/or the integrated services digital network (ISDN). Another circuit-switched, external core network may correspond to another-Public Land Mobile radio Network (PLMN) 13. A representative, packet-switched, external core network shown as cloud 14 may be for example an IP network such as the Internet. The core networks are coupled to corresponding network service nodes 16. The PSTN/ISDN network 12 and other PLMN network 13 are connected to a circuit-switched core node (CSCN) 18, such as a Mobile Switching Center (MSC), that provides circuit-switched services. The UMTS 10 may co-exist with an existing cellular network, e.g., the Global System for Mobile Communications (GSM). The packet-switched network 14 is connected to a packet-switched core node (PSCN), e.g., a General Packet Radio Service (GPRS) node 20 tailored to provide packet-switched type services in the context of GSM which is sometimes referred to as the Serving GPRS Service Node (SGSN). Each of the core network service nodes 18 and 20 connects to a UMTS terrestrial radio access network (UTRAN) 24 over a radio access network interface. The UTRAN 24 includes one or more radio network systems (RNS) 25 each with a radio network controller (RNC) 26 coupled to a plurality of base stations (BS) 28 and to the RNCs in the UTRAN 24.

Preferably, radio access over the radio interface in the UMTS 10 is based upon wideband, Code Division Multiple Access (WCDMA) with individual radio channels allocated using CDMA spreading codes which may each include both a channelization code and a scrambling code. Of course, other access methods may be employed like the well known TDMA access used in GSM. WCDMA provides wide bandwidth for multimedia services and other high transmission rate demands as well as robust features like diversity handoff and RAKE receivers to ensure high quality communication service in a frequently changing environment. Each mobile station is assigned its own spreading code in order for a base station 28 to identify transmissions from that particular mobile station. The mobile station also uses its own spreading code to identify transmissions from the base station either on a general broadcast or common channel or transmissions specifically intended for that mobile station. That spreading code distinguishes the spread signal from all of the other transmissions and noise present in the same area.

Different types of control channels are shown bridging the radio interface. For example, in the forward or downlink direction, there are several types of common control channels including a general broadcast channel (BCH), (there is only one broadcast channel per cell), a paging channel (PCH), and a forward access channel (FACH). In the reverse or uplink direction, a random access channel (RACH) is employed by mobile stations whenever access is desired to perform location registration, call origination, page response, and other types of access operations.

In general, each radio controller includes a memory coupled to data processing circuitry that performs numerous radio and data processing operations required to perform its control function and conduct communications between the RNC and other entities such as the core network service nodes, other RNCs and base stations. Data processing circuitry may include any one or a combination of suitable programmed or configured general purpose computer, microprocessor, microcontroller, dedicated logic circuitry, DSP, ASCI, etc. The base station similarly includes data processing in control circuitry, which in addition performs processing operations relating to communications with the RNC, performs a number of measurements in control operations associated with radio base station equipment. Data processing, memory, and transceiving circuitry is employed in each mobile station. The mobile station also includes a user interface with a speaker, microphone, keypad, display, and is typically powered by a battery.

Each base station shown FIG. 1 may include one or more physical sectors, and each sector provides coverage for a certain geographical area associated with the base station. Referring to the example in FIG. 2, each of three sectors 1—3 has a corresponding antenna(s), transceiving hardware, and data and signal processing hardware to permit wideband-CDMA communications with mobile stations. In the present invention, each sector is mapped to one or more logical cells, and each cell may have one or more radio frequency carriers. For the example in FIG. 2, each sector includes four carriers f1–f4. Cell 1 is mapped to a base station sector with cell carriers f1 and f2; cell 2 is mapped to cell carrier f3; and cell 3 is mapped to cell carrier f4. Neighboring cells can also have the same carriers.

Further understanding of the cell definition in the present invention is outlined in the example illustration of potential components of a single base station cell in FIG. 3. The cell includes a primary carrier and zero or more secondary carriers that primarily provide additional traffic channels. Each carrier can encompass a wide frequency band, e.g., 5 MHz, in a WCDMA system. The primary carrier of a cell has one primary spreading code and zero or more secondary spreading codes. (A spreading code may include both a scrambling code and a channelization code; however, the details of specific CDMA codes are not essential to understanding of the invention). Each secondary carrier of a cell (if any) has one or more secondary spreading codes. The number of secondary carriers in this definition may differ in the downlink direction (base station-to-mobile station) from the uplink direction (mobile station-to-base station). Associated with each channelization code is one or more physical channels, such as a common control physical channel (CCPCH), that may be mapped to one or more transport channels such as a broadcast channel (BCH). Other example, non-limiting channel mappings are shown and defined in FIG. 3.

The definition of such a logical cell provides considerable flexibility in allocation of various radio resources to mobile station connections that require different services like speech, email, web browsing, downloading files from the web, video, etc. As mentioned above, a plural carrier cell can provide higher bit rate opportunities to better service a wide range of mobile connections. However, this flexibility and capability adds some complexity with respect to identifying various resource status and capability changes at each base station.

The radio network controller (RNC) must allocate and monitor resources like spreading codes (corresponding to various channels) based on this multi-carrier cell definition. If resources are identified in the context of the cell, as they often are, they may be unique only within the context of that cell. Consequently, the cell resource identifier is not unique outside of the context of that cell, and therefore, presents a potential ambiguity to the base station. For example, FIG. 4 shows a simplified, example situation where two sectors 1 and 2 of a base station are each configured with three cells. The three cells of the base station sector 1 are identified with cell IDs 1, 2 and 3. The three cells of base station sector 2 are identified with cell IDs 4, 5, and 6. Unfortunately, every one of the six cells identifies a first channel resource with the same channel ID "1." Thus, the channel resource identifier is cell unique, but not unique outside of that cell. A base station status message that simply indicates a resource capability change, e.g., a decrease in channel capacity or an error or fault in the transceiver board assigned to that channel, cannot be resolved with certainty by the RNC using only the channel resource identifier. In short, the RNC does not know to which cell the cell resource status belongs. As a result, it may be necessary for the RNC to take remedial action, e.g., a reset or restart operation, for all resources in a cell or even in the entire base station.

In the present invention, a resource indication message sent from the base station to the radio network control node includes a cell resource identifier and indicates a status of a particular resource (e.g., a radio channel resource) within that cell. To eliminate any ambiguity at the radio network control node that might be created if cell resource identifiers are not unique outside of the cell, the cell resource identifier is specifically correlated with a corresponding cell identifier in the resource indication message. Non-limiting examples of cell identifier/cell resource identifier associations are described below in the context of a "service impacting" part of a resource status indication message (RSIM) in a wideband-CDMA cellular radio communications system.

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts. While individual functional blocks and components are shown in many of the figures, those skilled in the art will appreciate that these functions may be performed by individual hardware circuits, by a suitably programmed digital microprocessor or general purpose computer, by an application-specific integrated circuit (ASIC), and/or by one or more digital signal processors (DSPs).

FIG. 3 illustrates conceptually cell resources that may be allocated to a single cell in a base station;

DETAILED DESCRIPTION OF THE DRAWINGS

In the following description, for purposes of explanation and not limitation, specific details are set forth, such as particular embodiments, network architectures, signaling formats, techniques, etc., in order to provide an understanding of the present invention. However, it will be apparent to one skilled in the art that the present invention may be practiced in other embodiments that depart from these specific details. Detailed descriptions of well-known methods, interfaces, devices, protocols, and signaling techniques are omitted so as not to obscure the description of the present invention with unnecessary detail.

Figure 1:
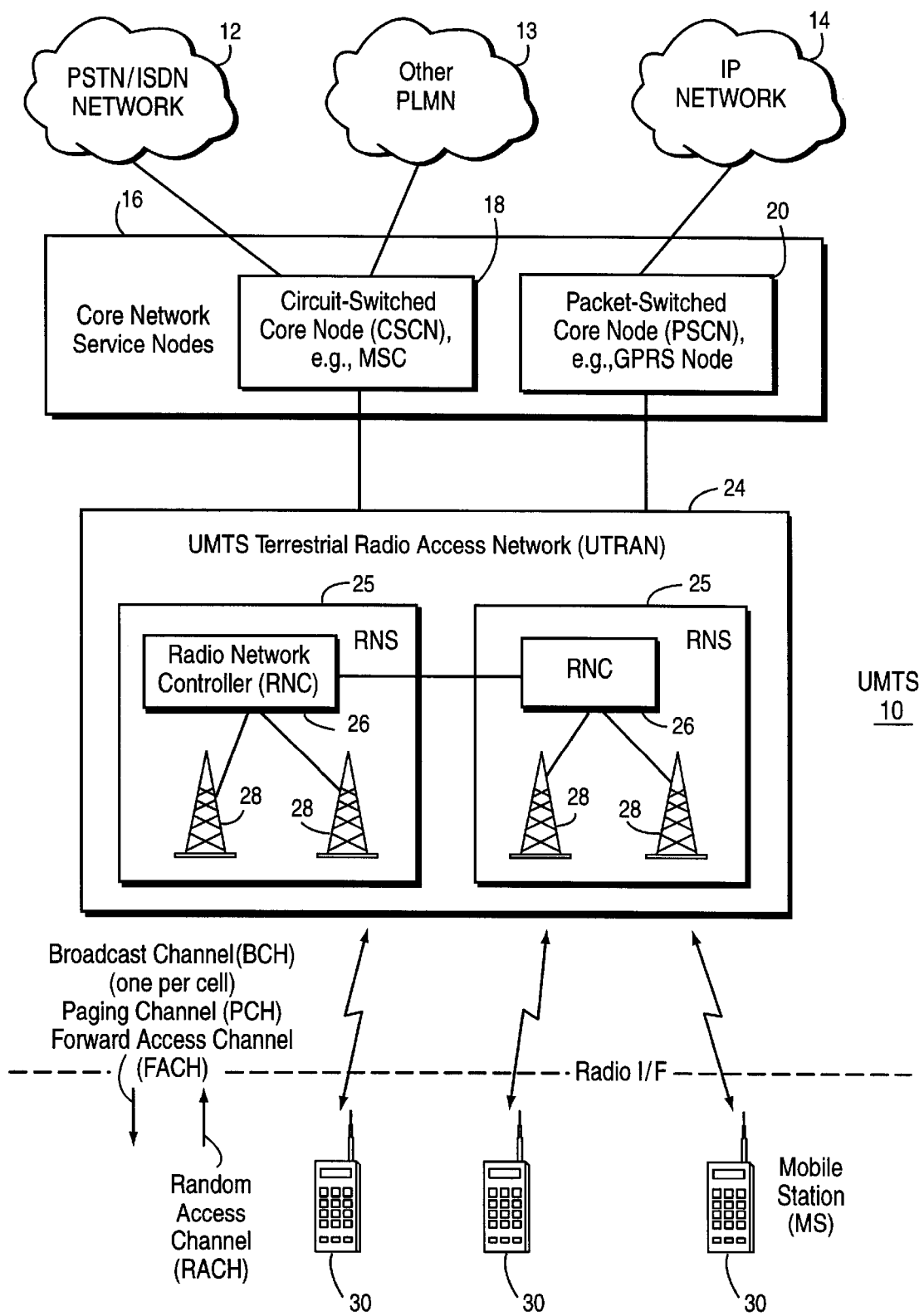
FIG. 1 is a function block diagram illustrating a universal mobile telephone system (UMTS) employing a UMTS terrestrial radio access network (UTRAN) in which the present invention may be advantageously employed.
Figure 2:
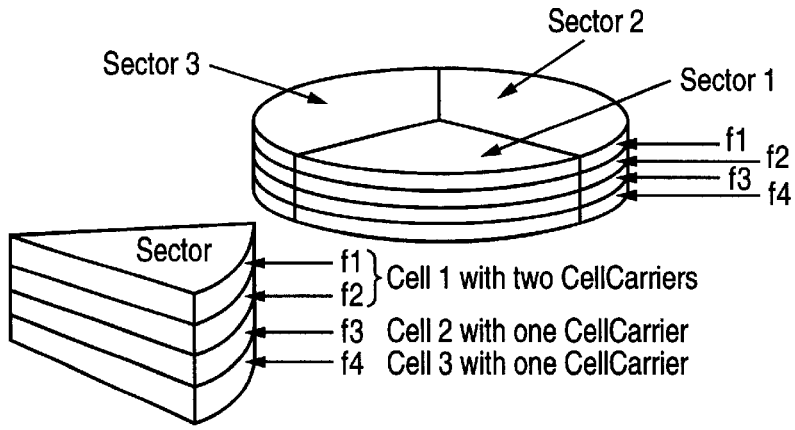
FIG. 2 illustrates conceptually a mapping between cells and sectors in a base station.
Figure 4:
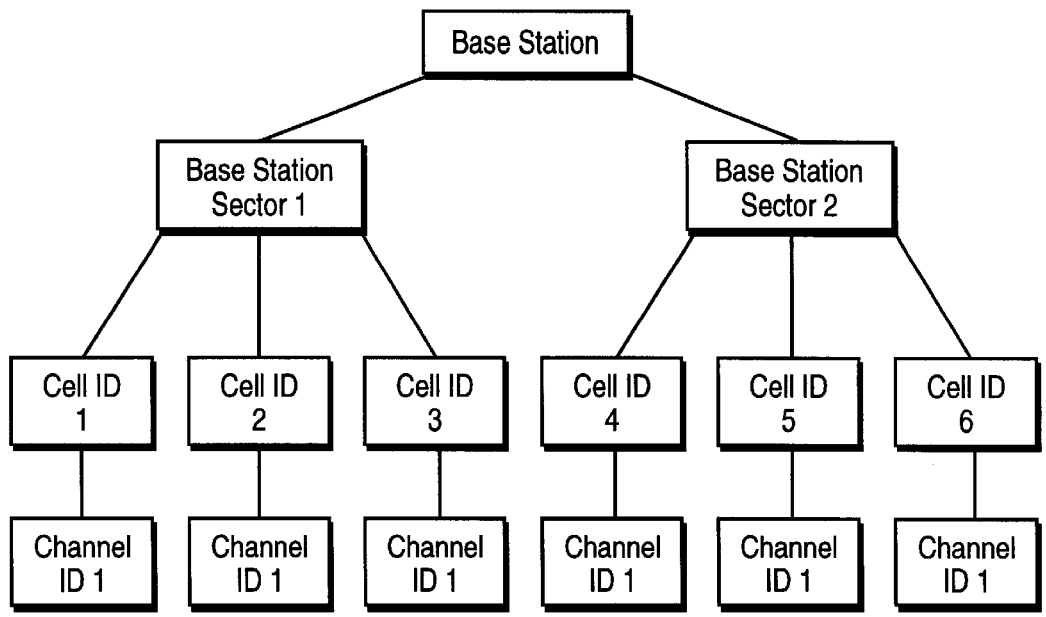
FIG. 4 is a diagram illustrating multiple cells using a same channel resource identifier.

The present invention may be advantageously employed in a wideband CDMA communications system, and in particular, the UMTS terrestrial radio access network (UTRAN) 24 shown in FIG. 1. Of course, the present invention may be applied to other types of cellular networks in which cells are mapped to physical resources in a base station and where status reports regarding such cells and their associated resources are provided from the base station to the radio network. For purposes of explanation, each cell is defined as described above with respect to FIGS. 2 and 3. In brief, each cell may be associated with primary and secondary radio frequency carriers and spreading codes associated with physical radio channels, which themselves are associated with transport channels.

Figure 5:
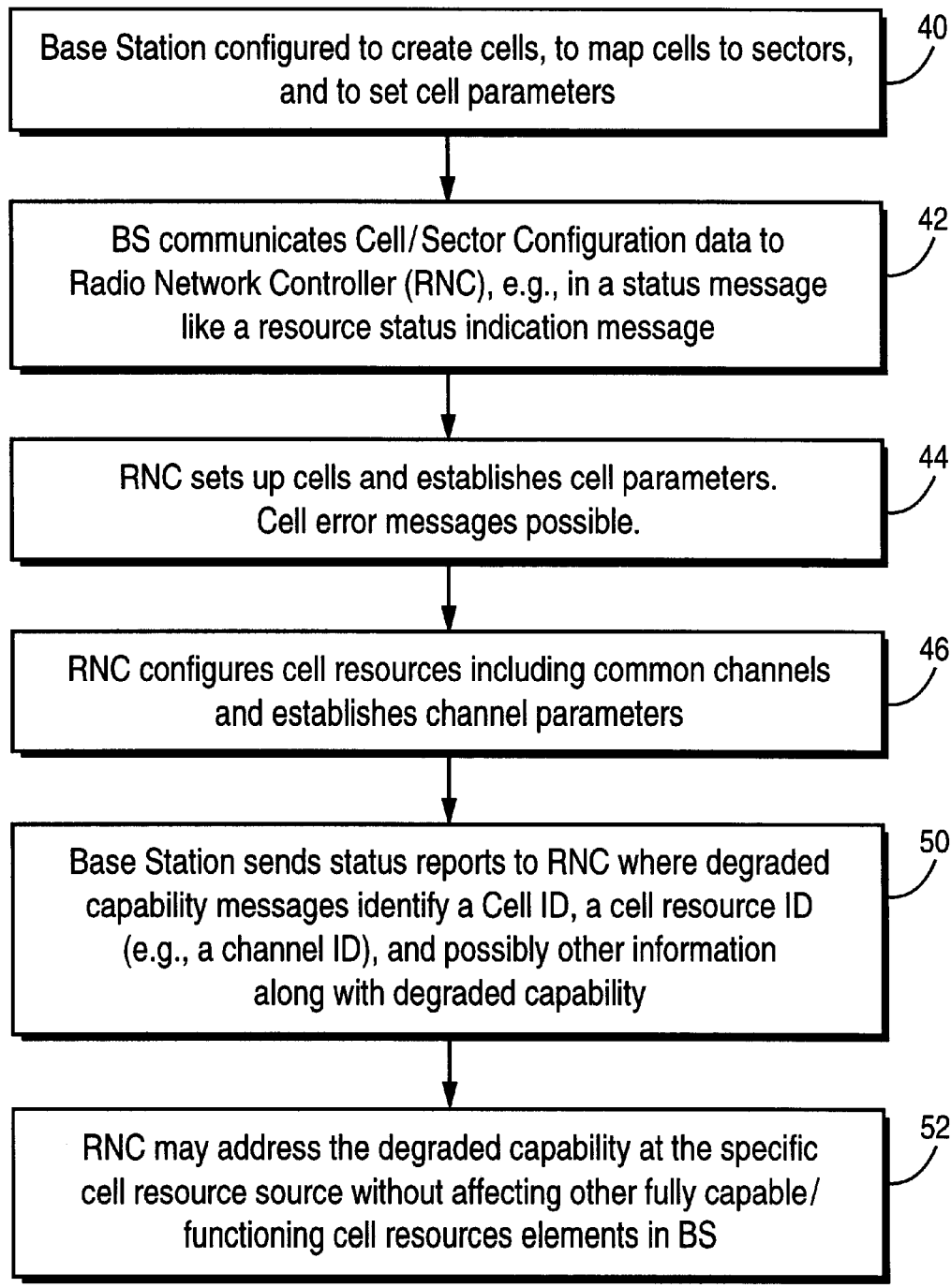
FIG. 5 is a flowchart diagram illustrating example cell and cell resource configuration and status messaging procedures employing one example of the invention.

The flowchart in FIG. 5 illustrates an overall base station configuration and status reporting procedure. Initially, a base station is configured, (e.g., by a base station operator using a PC or other means or by one or more program scripts), to create logical cells and to map those logical cells to physical base station sector hardware resources (block 40). Certain cell parameters including a local cell identifier (local cell ID), corresponding base station sector identifier (sector ID), a number of RF carriers, specific auxiliary equipment, the possibility to use transmitter and/or receiver diversity, maximum downlink power capability (which depends on the sector hardware configuration), and others are established.

The base station then communicates this cell sector configuration data to the radio network controller (RNC) in a status message such as a resource status indication message (RSIM) (block 42). In response to the status message, the RNC "sets up" the cell and establishes appropriate cell parameters including for example: local cell ID (used by the BS), cell ID (used by the RNC), central radio frequency indicating uplink/downlink, maximum transmission power, primary scrambling code number, channel IDs, (e.g., P/S-SCH, P/S-CHICH, PCCPCH (BCH)), corresponding power values for those identified channels, etc. In setting up a cell, the RNC establishes a global cell identifier (cell ID) and associates it with the local cell ID provided to the base station by an operator. The RNC further establishes a central frequency used to define uplink and downlink frequencies within the cell, or the RNC may also establish specific uplink and downlink frequency numbers. After the RNC sets up the cell, the base station is able to send data messages reporting resource availability, capability, errors, faults, or other messages to the RNC (block 44).

Also following cell setup, the RNC-configures cell resources including various radio channels, e.g., common channels, traffic channels, etc., along with cell resource parameters (block 46). For channel type cell resources, examples of cell resource parameters include: channel IDs, DL scrambling codes, DL channelization codes, scrambling code word number in the UL, different power values for each channel, pilot bits and indicators of different links.

Once cell resource configuration is completed, the base station sends status messges/reports to the RNC. One of the things included in such a status report is a cell resource capability/error message (block 48). For example, the report might indicate that a cell resource identified by corresponding cell ID is at 30% reduced capacity or that a cell resource is registering an error. To permit the RNC to resolve the exact identity of that cell, the status message also includes the cell ID correlated in some fashion with the cell resource ID. The RNC may then choose to follow a course of action to remedy (or at least address) the indicated problem (block 52) without affecting other, fully capable/functioning cell resource elements in the cell or the base station. That remedial action may be in the form of a command (e.g., restart) that uses both the cell ID and the cell resource.

Figure 6A:
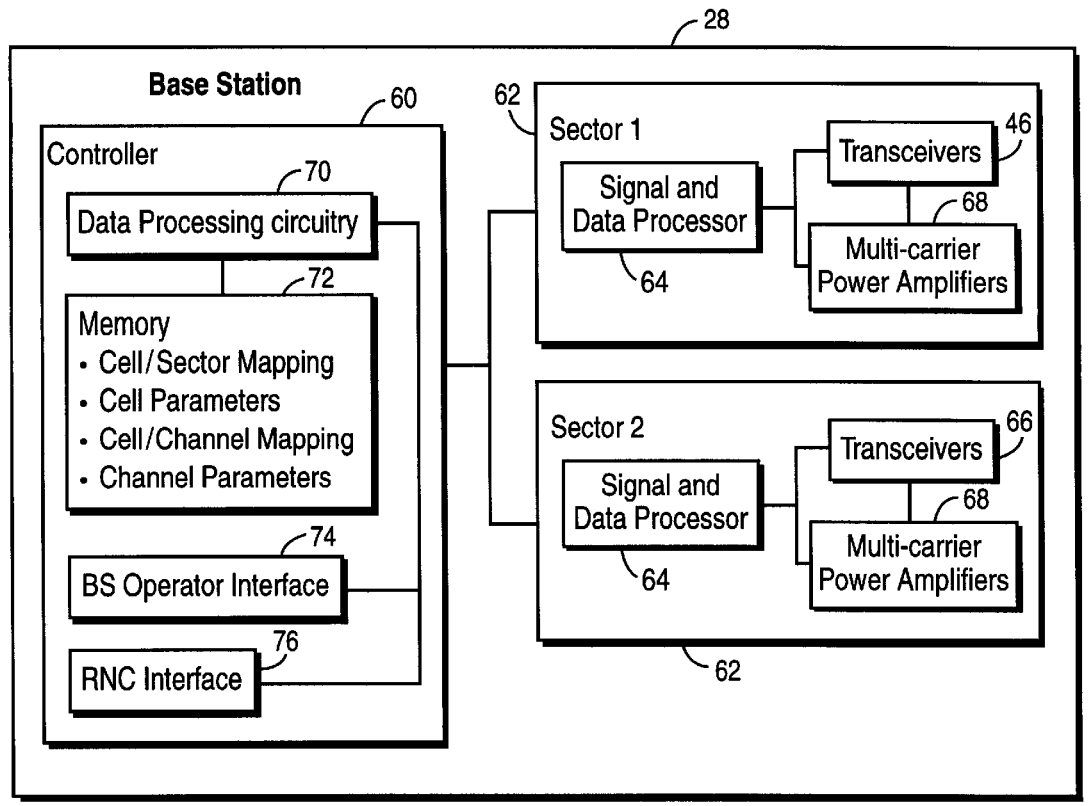
FIG. 6A is a function block diagram illustrating a simplified base station.
Figure 6B:
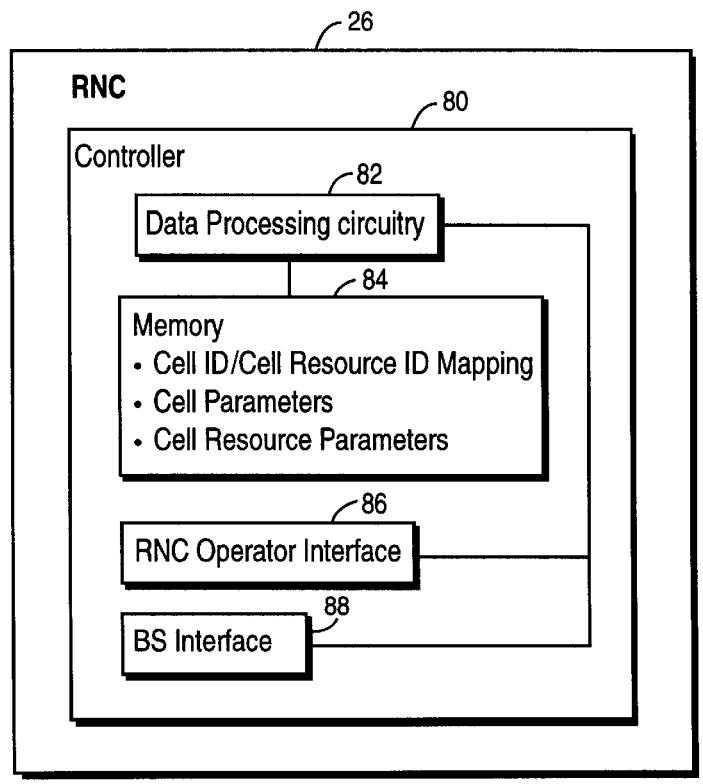
FIG. 6B is a function block diagram illustrating a simplified radio network controller.

A simplified function block diagram of a base station (BS) that may be used to implement the present invention is shown in FIG. 6A. The base station 28 includes a controller 60 coupled to two or more sectors 62. Each sector 62 includes signal and data processing hardware and software 64 coupled to plural radio transceivers 46 and multi-carrier power amplifiers 68. Each of the sector transceivers and multi-carrier power amplifiers is an example of a hardware cell resource, while a spreading code is an example of a software cell resource. The base station controller 60 includes data processing circuitry 70 coupled to memory 72, a base station operator interface, and an RNC interface 76. The memory 72 may store programming and data including cell/sector mapping software and tables, cell parameters, cell ID/cell resource ID mapping software and tables (where the example cell resource is illustrated as a channel), and cell resource (e.g., channel) parameters. A simplified function block diagram of a radio network controller (RNC) that may be used to implement the present invention is shown in FIG. 6B. The RNC 26 has a controller 80 that includes data processing circuitry 82 coupled to memory 84, an RNC operator interface, and a base station interface 88. The memory 72 may store programming and data including cell ID/cell resource ID mapping, cell parameters, and cell resource parameters.

Figure 7:
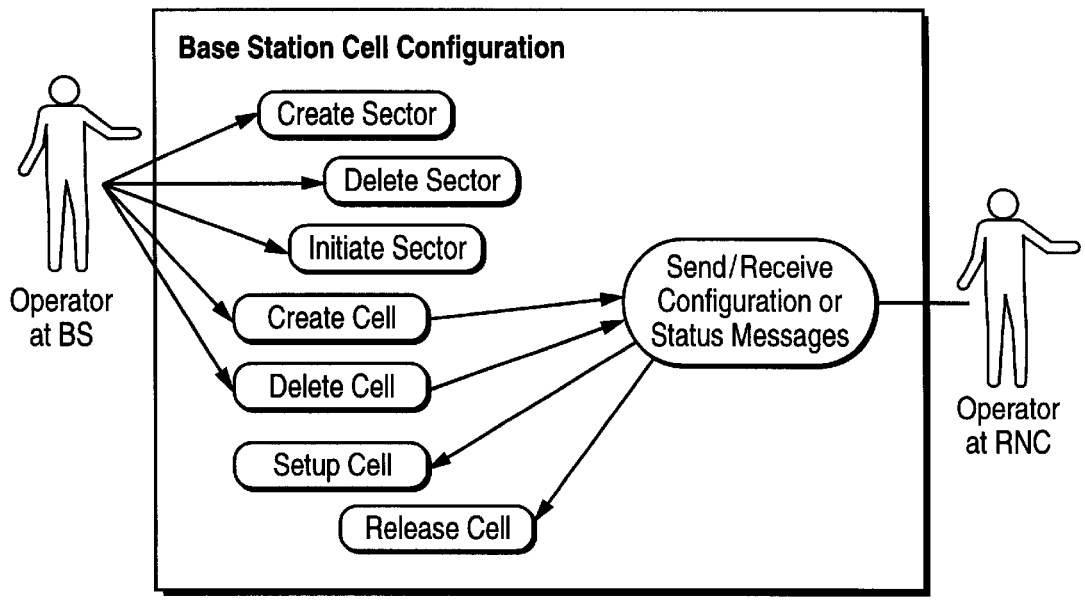
FIG. 7 is a conceptual diagram illustrating base station cell configuration.
Figure 8:
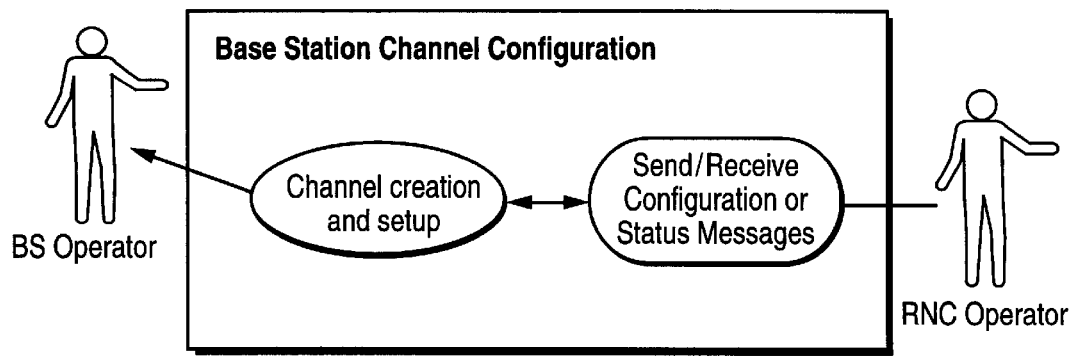
FIG. 8 is a conceptual diagram illustrating base station channel configuration.

The base station and RNC described above and illustrated in FIGS. 6A and 6B configure and monitor BS cells and BS cell resources. FIG. 7 illustrates conceptually a base station cell configuration. Initially, an operator at the base station creates (or deletes) sectors, initiates created sectors, and then creates (or deletes) cells which are mapped to specific ones of the created sectors. The base station operator employs a local base station cell ID to map each cell to a specific one of the base station sectors. The base station operator also sets, via a management interface, various base station sector and cell parameters. Once a cell is created, and the mapping and parameter setting complete, a configuration message is sent from the base station to the RNC. An operator at the RNC then performs its own configuration or setup of that cell, cell resources, and associated parameters using an RNC cell ID rather than the base station local cell ID. As in the base station, cell resource IDs may be mapped in the RNC to specific cell IDs to permit more effective monitoring and handling of resource capability and error/fault messages.

Figure 9A:
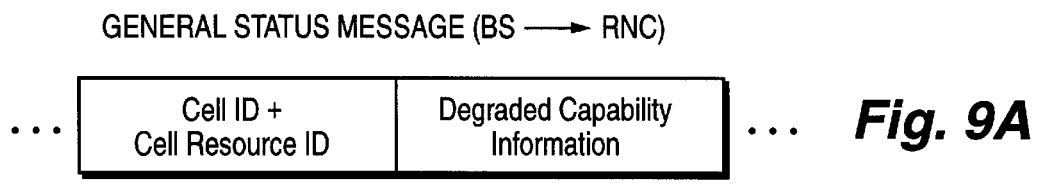
FIG. 9A illustrates a general status message in accordance with one example of the invention.
Figure 9B:
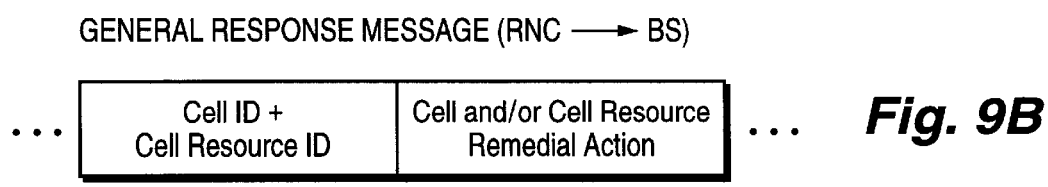
FIG. 9B illustrates a general response message in accordance with the example embodiment of FIG. 9A.

Status messages are sent from the base station to the RNC, and the RNC sends response messages back to the base station to take some appropriate, (e.g., remedial or corrective), action. In accordance with the present invention, both messages may be formatted to correlate or associate in some fashion a cell resource ID corresponding to the resource being reported and the corresponding cell ID where that cell resource is located. FIG. 9A shows an example, partial format of a general status message from the base station to the RNC including correlated cell ID and cell resource ID information along with degraded capability and/or error information. With the correlated cell ID and cell resource ID information, the RNC can resolve without ambiguity the specific cell resource to be analyzed. Based on that analysis, the RNC can focus any remedial action specifically on that cell resource without affecting other cell resources that do not need that remedial action. FIG. 9B shows a partial format for a general response message from the RNC to the base station. Again, the cell ID and cell resource ID are associated in some fashion in the cell and/or cell resource remedial action command. Example remedial actions include restarting the cell or cell resource, performing an error corrective action other than restart the cell or cell resource, and taking the cell or cell resource down.

One non-limiting example of such messages is a resource status indication message (RSIM) used in a third generation cellular system specified in the technical specification for group radio access network. The 3G TS 25.433 V3.0.0 technical specification for the "UTRAN Iub Interface NBAP Signalling" is incorporated herein by reference. The RSIM in FIG. 12A includes a "no failure" part and a "service impacting" part. See Section 9.1.31 of the above-referenced specification. The "no failure" part of the RSIM is used by the base station to report cell capabilities when a cell is created locally at the base station and is ready for setup by the RNC. The local cell information includes a local cell ID, an Add/Delete indicator, and a maximum DL power capability.

Figure 12A:
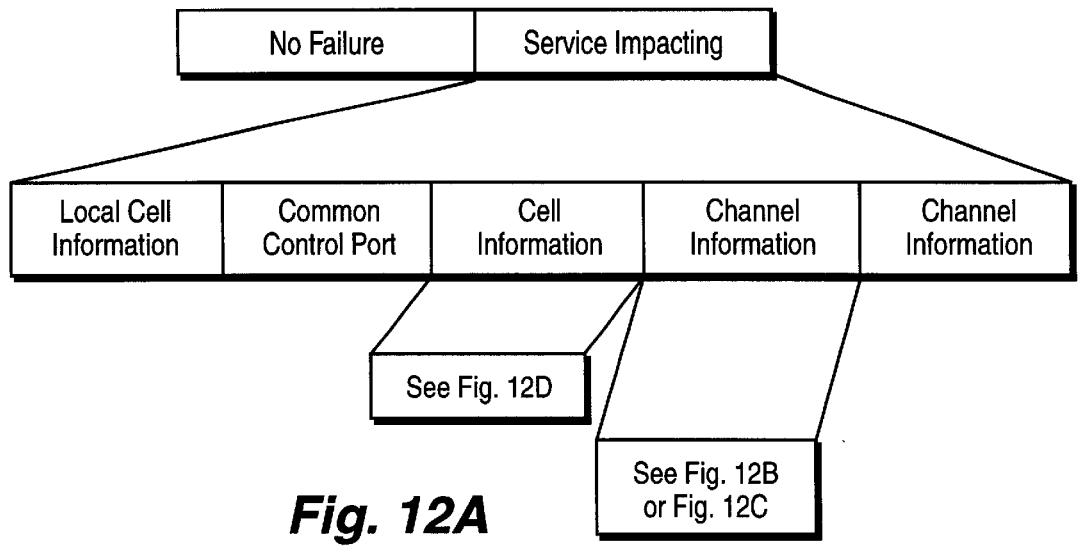
FIGS. 12A–12D show different example resource status indication message formats in accordance with the present invention.

The "service impacting" part of the RSIM is used to report degraded capability or errors for either the cell or cell resources. For ease of description and not limitation, channels are used as example cell resources below. As shown in FIG. 12A, the service impacting part of the RSIM includes: local cell information, a common control port, cell information, and plural channel information fields. The local cell information field includes local cell ID and maximum DL power capability. The communication control port information field includes a communication control port ID, resource operational state, and availability status. The cell information field includes cell ID, resource operational state, availability status, maximum DL power capability, and minimum spreading factor. A channel information field is provided for each channel such as primary and secondary SCHs, primary and secondary CPICH, primary and secondary CCPCH, BCH, PCH, PICH, FACH, PRACH, RACH, AICH, and PSCH. The channel information field includes common physical channel ID, resource operational state, and availability status information for each channel.

Figures 10, 11:
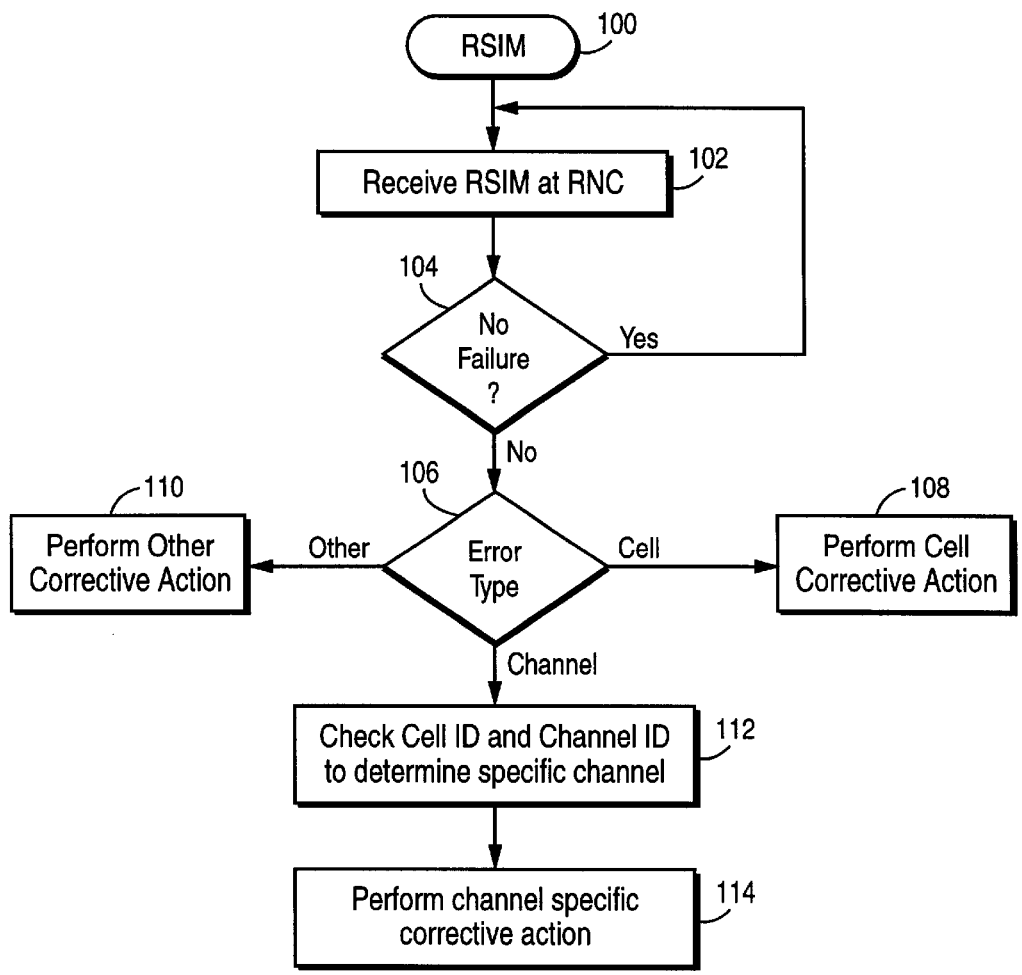
FIG. 10 is a flowchart diagram illustrating a procedure for handling a resource status indication message in accordance with an example embodiment of the present invention.
FIG. 11 illustrates conceptually examples of how the resource status indication message referenced in FIG. 10 may be modified in accordance with different examples of the present invention.

FIG. 10 illustrates in flow chart form example RSIM procedures (block 100) that may be followed by the RNC to analyze an RSIM message received from a base station. Initially, the RNC receives an RSIM from a base station (block 102). A decision is made in block 104 whether the RSIM contains "no failure" information. If not, the service impacting part is analyzed to determine if any type of error is present (block 104). Reported cell errors require corrective action for an entire cell (block 108), while errors other than channel errors may require some other corrective action (block 110). One example of a cell error is a loss of downlink power capability that might require an action from a neighboring base station to take over coverage of the area by increasing its power. Another example is a hardware error that removes one cell carrier in one base station sector or eliminates an antenna branch. It is important that the RNC be notified of the specific, unambiguous location of the error in order to take effective, focused corrective action.

For channel errors, the RNC determines from the RSIM both the cell ID and the channel ID (block 112) so that the RNC knows which specific channel has an error. With this specific information, the RNC may then perform a channel specific corrective action like a reset or restart operation (if desired) without necessarily affecting the overall cell or other cell channels (block 114). A channel may be "restarted" from the RNC by setting up a new channel within the cell and removing the faulty channel. While these two actions may be performed in any order, it is preferable to set up the new channel before releasing the old channel.

Figure 12B:
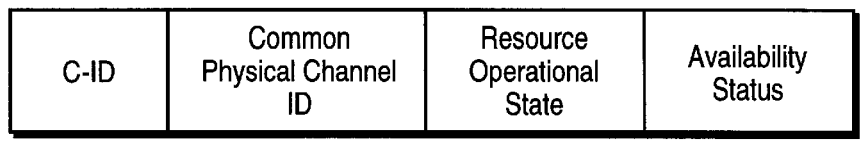

There are many different ways in which the cell ID is correlated in the RSIM with the channel ID. Several non-limiting examples are shown in FIG. 11. First, a cell ID may be added in each channel information field. Thus, in addition to common physical or transport channel ID, resource operational state, and availability status, the channel information also includes a cell ID. This first example implementation is illustrated in FIG. 12B.

Figure 12C:
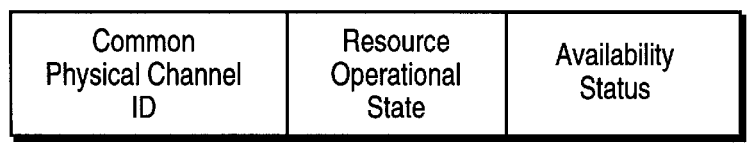

A second example implementation is shown in FIG. 12C. The channel identifier is defined to be unique in the base station rather than only unique within the context of a single cell. The channel identifier is replaced with a unique common physical channel ID. One way of obtaining that uniqueness is to combine both the cell ID and common channel ID to generate the common physical channel ID.

Figure 12D:
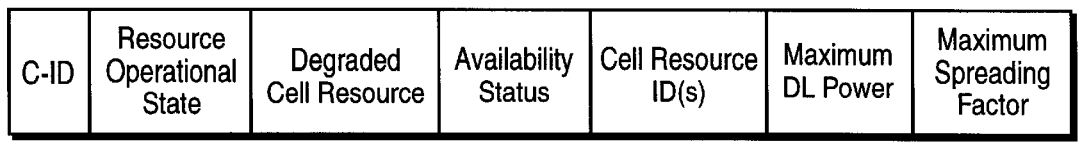

A third example option is add an availability status to the cell information field indicating that the cell is functioning properly, but that an identified channel has an error. FIG. 12D shows the addition of degraded cell resource and availability status information. Again, the cell ID is correlated with a specific cell resource (like a channel) ID.

Each of these example implementations correlates the cell ID with the channel ID so that the RNC may determine without ambiguity the identity of the channel having degraded capability or other error. As a result, the RNC can take corrective action to address the specific problem without impacting other cell resources operating properly and at full capacity. This correlation permits the RNC and base station to work more effectively together, which is particularly helpful if the RNC and base station are made by different manufacturers. A less desirable alternative than those described above requires that when an erroneous cell is detected in a received RSIM, the RNC check the status of all of the channels identified in the RSIM. By checking all of the channels of all the reported cells, the RNC knows which channel is faulty. This approach would then be implemented at the cell level, e.g., in block 108 in FIG. 10.

While the present invention has been described with respect to a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. For use in a radio communications system having a radio network control node coupled to a base station for communicating with mobile stations over a radio interface via the base station, where the base station includes one or more cells each having plural cell resources, a resource indication message sent from the base station to the radio network control node indicating a status of a particular cell resource identified by a cell resource identifier, wherein the cell resource identifier is associated with a cell identifier in the resource indication message.

2. The resource indication message in claim 1, wherein the cell resource is a radio channel resource.

3. The resource indication message in claim 2, wherein the message has a channel information field that includes a cell identifier, a channel identifier, and a resource operational or availability status.

4. The resource indication message in claim 2, wherein the message has a channel information field that includes a base station channel identifier combining the cell identifier and the cell resource identifier and a resource operational or availability status.

5. The resource indication message in claim 2, wherein the message has a cell information field that includes the cell identifier, the cell resource identifier, and a resource operational or availability status.

6. The resource indication message in claim 1, wherein a same cell resource identifier may be used by plural cells.

7. The resource indication message in claim 1, wherein the message indicates a degraded capability of the cell resource.

8. The resource indication message in claim 1, wherein the message indicates an error in the cell resource.

9. The resource indication message in claim 2, wherein the resource indication message includes a no failure part and a service impacting part, the service impacting part including the channel identifier associated with the cell identifier.

10. For use in a radio communications system having a radio network control node coupled to a base station for communicating with mobile stations over a radio interface via the base station, the base station comprising:

plural base station sectors each sector including radio transceiving equipment;

a controller for establishing one or more cells, each cell mapped to one of the sectors and being configured with plural cell resources, wherein the controller is configured to send a resource indication message to the radio network control node indicating a degraded capability or error of a particular cell resource having a cell resource identifier, the cell resource identifier being associated with a corresponding cell identifier in the resource indication message.

11. The base station in claim 10, wherein the cell resource is a radio channel resource.

12. The base station in claim 10, wherein a same cell resource identifier may be used by plural cells.

13. For use in a radio communications system having a radio network control node coupled to a base station for communicating with mobile stations over a radio interface via the base station, the radio network control node comprising:

a controller for configuring one or more cells in the base station, each cell being configured with plural cell resources, wherein the controller is configured to analyze a resource indication message received from the base station indicating a degraded capability of or an error with a particular cell resource having a cell resource identifier, the cell resource identifier being associated with a corresponding cell identifier in the resource indication message, and wherein the controller is configured to determine whether a response message regarding the degraded capability or error directed specifically to the particular cell resource should be generated.

14. The radio network control node in claim 13, wherein the response message identifies both the cell and the cell resource.

15. The radio network control node in claim 13, wherein a same cell resource identifier may be used by plural cells.

16. In a radio communications system having a radio network control node coupled to a base station for communicating with mobile stations over a radio interface via the base station, the base station having plural base station sectors, each sector including radio transceiving equipment, a method comprising:

establishing one or more cells;

mapping each cell to one of the sectors, configuring each with plural cell resources; and sending a resource indication message to the radio network control node indicating a degraded capability or error of a particular cell resource having a cell resource identifier, wherein the cell resource identifier is associated with a corresponding cell identifier in the resource indication message.

17. The method in claim 16, wherein the cell resource is a radio channel resource.

18. The method in claim 16, wherein a same cell resource identifier may be used by plural cells.

19. The method in claim 16, further comprising:

analyzing resource indication message received from the base station indicating a degraded capability of or an error with a particular cell resource having a cell resource identifier, the cell resource identifier being associated with a corresponding cell identifier in the resource indication message, and determining whether a response message regarding the degraded capability or error directed specifically to the particular cell resource should be generated.

20. The method in claim 19, wherein the response message identifies both the cell and the cell resource.

21. The method in claim 19, wherein a same cell resource identifier may be used by plural cells.

22. The resource indication message in claim 1, wherein the cell identifier identifies a logical cell mapped to one or more base station sectors.

23. The base station in claim 10, wherein each cell is a logical cell.

24. The radio network controller in claim 13, wherein each cell is a logical cell.

25. The method in claim 25, wherein each cell is a logical cell.

* * * * *